United States Patent [19]

Nishida et al.

[11] Patent Number: 4,544,235

[45] Date of Patent: Oct. 1, 1985

[54] PLASTIC OPTICAL FIBERS

[75] Inventors: Kozi Nishida, Otake; Takashi Yamamoto, Hiroshima, both of Japan

[73] Assignee: Mitsubishi Rayon Co., Ltd., Tokyo, Japan

[21] Appl. No.: 504,877

[22] Filed: Jun. 16, 1983

[30] Foreign Application Priority Data

Jul. 5, 1982 [JP] Japan ................... 57-116482
Jul. 7, 1982 [JP] Japan ................... 57-118014
Jul. 8, 1982 [JP] Japan ................... 57-119075

[51] Int. Cl.[4] ............... D02G 3/00; B29D 11/00
[52] U.S. Cl. ............... 350/96.34; 350/96.30; 526/245
[58] Field of Search ........... 350/96.30, 96.31, 96.34; 264/2.7

[56] References Cited

U.S. PATENT DOCUMENTS

| | | | |
|---|---|---|---|
| 3,993,834 | 11/1976 | Chimura et al. | 350/96.34 X |
| 3,999,834 | 12/1976 | Ohtomo et al. | 350/96.34 |
| 4,138,194 | 2/1979 | Beasley et al. | 350/96.30 |
| 4,161,500 | 7/1979 | Schleinitz et al. | 264/2.7 |
| 4,381,269 | 4/1983 | Kaino et al. | 350/96.30 X |

FOREIGN PATENT DOCUMENTS

| | | | |
|---|---|---|---|
| 0008321 | 2/1981 | Japan | 350/96.34 |
| 1037498 | 7/1966 | United Kingdom | 350/96.34 |

*Primary Examiner*—William L. Sikes
*Assistant Examiner*—Akm E. Ullah
*Attorney, Agent, or Firm*—Oblon, Fisher, Spivak, McClelland & Maier

[57] ABSTRACT

A plastic optical fiber comprising a core which comprising a transparent polymer (1); and said cladding comprises a transparent copolymer (2) comprising about 20 to 99% by weight of a comonomer (A) selected from the group consisting of fluoroalkylacrylates, fluoroalkylmethacrylates or a mixture thereof; 0.05 to 10% by weight of a comonomer (B) comprising at least one vinyl monomer having at least one hydrophilic radical, wherein said core polymer (1) and said cladding copolymer (2) have refractive indices $n_1$ and $n_2$, respectively, and which satisfy the relationship: $(n_1 - n_2 \geq 0.01)$; and optionally, 79.95% or less of at least one vinyl monomer (C) which is different from comonomers (A) and (B), thereby attenuating the refractive index of said cladding copolymer. The plastic optical fiber has an excellent light transmitting property, thermal resistance and bonding between the core and cladding constituents thereof.

17 Claims, 3 Drawing Figures

4,544,235

PLASTIC OPTICAL FIBERS

BACKGROUND OF THE INVENTION

(1) Field of the Invention

The present invention relates to a plastic optical fiber, more particularly to a plastic optical fiber having a core-cladding structure and exhibiting excellent light transmission properties.

(2) Description of the Prior Arts

Improvements in the light transmission properties of optical fibers has led to their increased use in the fields of optical communication and the like.

Conventional optical fibers include those having a core consisting of a glass and those having a core consisting of a plastic material. The conventional glass core optical fibers exhibit excellent light transmission properties and, therefore, are useful in long distance communication. However, this type of optical fiber exhibits poor flexibility and, therefore, easily breaks.

Plastic core optical fibers on the other hand can transmit light only a relatively short distance. However, this type of optical fiber exhibits excellent flexibility and, thus, is very useful for short distance communication devices.

Conventional plastic core optical fibers are mainly of a step index type. A step index type optical fiber is composed of a core comprising a polymer of a high refractive index and a cladding comprising a polymer of a low refractive index. When light is applied to the step index type optical fiber, the light is transmitted through the core and is reflected entirely on the interface between the core and the cladding. In this case, it is important that the cladding be firmly bonded to the core and that the cladding be highly resistant to formation of cracks therein.

Japanese Patent Publication No. 43-8978 discloses an optical fiber comprising a core consisting of polystyrene and a cladding consisting of polymethylmethacrylate. The bonding property of polystyrene to polymethylmethacrylate, however, is unsatisfactory. Therefore, the resultant optical fiber has unsatisfactory optical properties at the interface between the core and the cladding.

Another type of optical plastic fiber, as disclosed in several references, comprises a core consisting of polymethylmethacrylate, exhibitng a high transparency, and a cladding consisting of a fluorine-containing polymer.

For example, Japanese Patent Publication Nos. 43-8973, 56-8321, 56-8322, and 56-8323 disclose plastic optical fibers comprising a core consisting of polymethylmethacrylate and a cladding consisting of a polymer of polyfluorinated alkyl methacrylate. The polyfluorinated alkyl methacrylate polymer, however, exhibits a poor bonding property to the polymethylmethacrylate core and poor resistance to thermal decomposition thereof, and therefore, is unsatisfactory as a material for forming the cladding.

In still another type of plastic optical fiber, the core consists of polymethylmethacrylate and the cladding consists of a copolymer of vinylidene fluoride with tetrafluoroethylene. In this optical fiber, the cladding can be firmly bonded to the core. However, since the vinylidene fluoride-tetrafluoroethylene copolymer is highly crystalline, the light transmitted through the core is scattered at the interface between the core and the cladding. This scattering phenomenon results in decreased light transmission.

The properties required for a polymer in plastic optical fibers are non-absorption non-scattering of light irradiated thereto, a low refractive index, and an excellent bonding property to the core. Polyfluorinated alkyl methacrylates exbibit a low refractive index and excellent transparency, but are unsatisfactory in resistance to thermal decomposition. Accordingly, conventional cladding polymers are not always satisfactory in some of the above-mentioned properties.

SUMMARY OF THE INVENTION

An object of the present invention is to provide a plastic optical fiber having an excellent light transmission property.

Another object of the present invention is to provide a plastic optical fiber wherein a core and a cladding thereof are firmly bonded to each other.

Still another object of the present invention is to provide a plastic optical fiber having a cladding which is highly resistant to thermal decomposition.

According to the present invention, the above-mentioned and other objects can be attained by a plastic optical fiber comprising a core and a cladding, wherein said core comprises a transparent polymer (1); and said cladding comprises a transparent copolymer (2) comprising about 20 to 99.95% by weight of a comonomer (A) selected from the group consisting of fluoroalkylacrylates, fluoroalkylmethacrylates or a mixture thereof; 0.05 to 10% by weight of a comonomer (B) comprising at least one vinyl monomer having at least one hydrophilic radical, wherein said core polymer (1) and said cladding copolymer (2) have refractive indices $n_1$ and $n_2$, respectively, and which satisfy the relationship (I):

$$n_1 - n_2 \geq 0.01 \qquad (I)$$

The cladding copolymer (2) may contain 79.95% or less of units derived at least one vinyl monomer (C) which is different from comonomers (A) and (B), thereby attenuating the refractive index of said cladding copolymer.

BRIEF DESCRIPTION OF THE DRAWINGS

Other objects, features and attendant advantages of the present invention will be more folly appreciated as the same becomes better understood from the following detailed description when considered in connection with the accompanying drawings.

DESCRIPTION OF THE PREFERRED EMBODIMENTS

Figure 1:
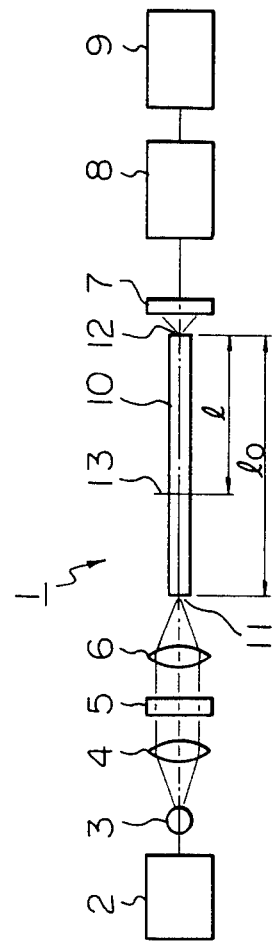
FIG. 1 is an explanatory side view of an apparatus for measuring light transmission loss of an optical fiber.

The optical plastic fiber of the present invention comprises a filamentary core extending along the longitudinal axis of the fiber and a cladding coating the core therewith to form a core-in-sheath structure.

The core comprises a transparent polymer material (1) having a refractive index $n_1$, which is preferably 1.44 or more. The cladding comprises a transparent copolymer (2) having a refractive index $n_2$, which is preferably in the range of from about 1.38 to about 1.45. It is important that the refractive index $n_1$ of the core polymer (1) and the refractive index $n_2$ of the cladding copolymer (2) satisfy the relationship (I):

$$n_1 - n_2 \geqq 0.01 \qquad (I)$$

If the difference between the refractive indices $n_1$ and $n_2$ is less than 0.01, the resultant optical fiber exhibits an unsatisfactory reflectance of light on the interface between the core and the cladding. This results in unsatisfactory light transmission through the resultant optical fiber. The larger the difference $n_1 - n_2$ of the optical fiber, the higher the light transmission of the optical fiber. Usually, the difference $n_1 - n_2$ is in a range of from 0.01 to 0.20.

The core polymer comprises at least one polymer selected from the group consisting of polystyrene (n=1.59); polymethylmethacrylate (n=1.49); methylmethacrylate copolymers containing at least 70% by weight of methylmethacrylate, for example, styrene-methylmethacrylate copolymers (n=1.50 to 1.58); poly-4-methylpentene-1 (n=1.49); polycarbonates (n=1.50 to 1.59); deuterated polymethylmethacrylate (n=1.59); deuterated styrene copolymers containing at least 70% by weight of deuterated styrene having a degree of deuteration of at least 50%; deuterated methylmethacrylate copolymers containing at least 70% by weight of deuterated methylmethacrylate having a degree of deuteration of at least 50%; methylmethacrylate-styrene-maleic anhydride terpolymers (n=1.50 to 1.58); methylmethacrylate- -methylstyrene-maleic anhydride terpolymers (n=1.50 to 1.58), methylmethacrylate-styrene-methylstyrene-maleic anhydride copolymers (n=1.50 to 1.58); and methylmethacrylate-vinyl toluene-maleic anhydride terpolymers (n=1.50 to 1.58).

The cladding copolymer (2) comprises 20% to 99.95% by weight of a monomer (A) selected from the group consisting of fluoroalkylacrylates, fluoroalkylmethacrylates, and mixtures thereof; and 0.05% to 10% by weight of a comonomer (B) comprising of least one vinyl monomer having at least one hydrophilic radical. That is, the cladding copolymer (2) contains copolymerized comonomers (A) and (B) as indispensable ingredients. The amounts of the indispensable comonomers used are such that when only comonomers A and B are used, the total of both represents 100%.

The cladding copolymer (2) may contain 79.95% by weight or less of an additional comonomer (C) which is copolymerized with the comonomer (A) and (B). The additional comonomer (C) consists of at least one vinyl monomer different from the comonomers (A) and (B).

If the amount of the additional comonomer (C) is more than 79.95% by weight, the resultant cladding copolymer (2) exhibits an unsatisfactory high refractive index and is not suitable for the optical fiber of the present invention.

Also, if the amount of the comonomer (A) is excessively small, that is, less than 20% by weight, the resultant copolymer exhibits an excessively high refractive index and, therefore, the resultant optical fiber exhibtis an unsatisfactorily large light transmission loss. If the amount of the comonomer (A) is excessively large, that is, more than 99.95% by weight, the resultant copolymer exhibits a poor bonding property to the core.

Comonomer (A) consists of at least one member selected from fluoroalkyl-acrylates and -methacrylates in which the alkyl radical preferably, has 1 to 12 carbon atoms, for example, 2,2,2-trifluoroethyl acrylate and methacrylate, 2,2,3,3-tetrafluoropropyl acrylate and methacrylate, and 2,2,3,3,3-pentafluoropropyl acrylate These ester compounds can be prepared by ester interchange reaction between acrylic or methacrylic acid and a fluoroalcohol compound, for example, trifluoroethyl alcohol, tetrafluoropropyl alcohol, or pentafluoropropyl alcohol, according to the conventional technique.

Comonomer (B) comprises of at least one vinyl monomer having at least one hydrophilic radical. Comonomer (B) is not only effective for moderating the water-repellent property and the oil-repellent property of the resultant cladding copolymer (2) derived from the fluorine-containing comonomer (A), but is also effective for enhancing the bonding property of the resultant cladding copolymer (2) to the core. Furthermore, comonomer (B) is surprisingly effective for enhancing the thermal decomposition resistance of the resultant cladding copolymer (2), without degrading the other inherent properties necessary to the plastic optical fiber.

The hydrophilic radical-containing vinyl monomer usable as comonomer (B) is preferably selected from the group consisting of ethylenically unsaturated mono-, di-, and polycarboxylic acids, ethylenically unsaturated epoxy monomers, ethylenically unsaturated carboxylic amides, N-methylolcarboxylic amides, and alkylethers of the above-metnioned amides.

The ethylenically unsaturated mono- and di-carboxylic acids include acrylic acid, methacrylic acid, crotonic acid, maleic acid, fumaric acid, itaconic acid, glutaconic acid, 3-methylglutaconic acid, muconic acid, dihydromuconic acid, methylenemalonic acid, citraconic acid, mesaconic acid, and methyleneglutaric acid. Acrylic and methacrylic acids are particularly preferable as the hydrophilic vinyl monomers in that they are highly effective for enhancing the bonding property of the resultant cladding copolymer (2) to the core constituent. More particularly, methacrylic acid is highly effective for enhancing the thermal decomposition resistance of the resultant cladding copolymer (2) and, therefore, is most preferable as a hydrophilic vinyl monomer.

The ethylenically unsaturated polycarboxylic acids include ester condensation products of at least one member selected from hydroxypropyl acrylate, hydroxypropyl methacrylate, hydroxyethyl acrylate, hydroxyethyl methacrylate, hydroxymethyl acrylate, and hydroxymethyl methacrylate with at least one member selected from succinic anhydride, phthalic anhydride, maleic anhydride, and trimellitic anhydride.

The ethylenically unsaturated epoxy monomers include glycidyl methacrylate, methylglycidyl methacrylate, and allylglycidylether. Glycidyl methacrylate and methylglycidyl methacrylate are especially highly effective for the bonding property of the resultant cladding copolymer (2) to the core constituent.

The ethylenically unsaturated carboxylic amides, N-alkylcarboxylic amides, N-methylol carboxylic amides, and alkylethers of the above-mentioned amides include acrylamide, methacrylamide, N-methylacrylamide, N-diethylacrylamide, mono-, di-, and esteramides of maleic, fumaric, itaconic, and other ethylenically unsaturated dicarboxylic acids, N-methylol acrylamide, N-methylol methacrylamide, and ethers of the above-mentioned N-methylol amide compounds, for example, methlether, ethlether, 3-oxabutylether, 3,6-dioxaheptylether, and 3,6,9-trioxadecylether of N-methylol acrylamide and methacrylamide. The above-mentioned amide compounds are effective for enhancing the bonding property of the resultant cladding copolymer (2) to the core.

The hydrophilic vinyl monomers further include addition reaction products of at least one member selected from N-methylol acrylamide, N-methylol methacrylamide, and N-methylol maleic imide with ethylene oxide and N-vinyl amides, for example, N-vinyl acetamide and N-vinyl pyrrolidone.

In the cladding copolymer (2), the comonomer (B) is contained in an amount of from 0.05% to 10% by weight. When the content of comonomer (B) is less than 0.05% by weight, the resultant cladding copolymer (2) is unsatisfactory in its bonding property and, sometimes, in its thermal decomposition resistance. When the content of comoners (B) is more than 10% by weight, the resultant cladding copolymer (2) is unsatisfactory in its transparency and refractive index.

The additional comonomer (C) comprises at least one vinyl monomer different from those of comonomers (A) and (B). The vinyl monomer may be selected from methyl methacrylate, ethyl methacrylate, n-propyl methacrylate, n-butyl methacrylate, nonyl methacrylate, lauryl methacrylate, methyl acrylate, n-butyl acrylate, 2-ethylhexyl acrylate, styrene, α-methyl styrene, and maleic anhydride. Methacrylic acid esters have a superior copolymerizing property with comonomers(A) and (B) and, therefore, are useful as the additional vinyl monomers (C).

The additional vinyl monomer (C) is useful for controlling the refractive index of the cladding copolymer (2). However, as stated hereinbefore, the content of the additional monomer (C) is limited to 79.95% by weight or less.

The additional vinyl comonomer (C) is also effective for controlling the glass transition point of the cladding copolymer in consideration of use of the resultant optical fiber. A vinyl monomer which can be converted into a homopolymer having a high glass transition point is effective for increasing the glass transition point of the resultant cladding copolymer. A vinyl monomer which can be converted into a homopolymer having a low glass transition point is effective for decreasing the glass transition point of the resultant cladding copolymer.

The cladding copolymer (2) is prepared by copolymerizing comonomers (A), (B), and optionally (C) in the presence of a polymerization initiator. The initiator may consist of at least one radical polymerization initiating compound selected from, for example, organic peroxide such as di-tert-butyl peroxide, dicumyl peroxide, methylethylketone peroxide, tert-butyl perphthalate, tert-butyl perbenzoate, methyl-isobutylketone peroxide, lauloyl peroxide, cyclohexyl peroxide, 2,5-dimethyl-2,5-di-tert-butyl peroxyhexane, tert-butyl peroctanoate, tert-butyl perisobutylate, tert-butyl peroxyisobutylate, tert-butyl peroxyisopropyl carbonates; and azo compounds such as methyl-2,2'-azo-bis-isobutylate, 1,1'-azo-bis-cyclohexane carbonitrile, 2-phenyl-azo-2,4-dimethyl-4-methoxyvaleronitrile, 2-carbamoyl-azo-bis-isobutylonitrile, 2,2'-azo-bis(2,4-dimethylvaleronitrile), and 2,2'-azo-bis-isobutylonitrile.

In the preparation of the cladding copolymer (2), a chain transfer agent consisting of an alkyl mercaptan, which is usually used as an agent for controlling the degree of polymerization, may be used.

The copolymerization of the comonomers (A), (B), and, optionally, (C) can be carried out by a conventional polymerization method, for example, a emulsion, suspension, bulk, or solution polymerization method. The bulk polymerization method is preferable for producing a copolymer having an enhanced degree of purity.

In the plastic optical fiber of the present invention, the thickness of the cladding is preferably in the range of from 1 to 100 microns, more preferably, from 2 to 50 microns. A cladding having a thickness of less than 1 micron is disadvantageous in that not only is it difficult to produce such a thin cladding but also such a thin cladding exhibits a decreased light reflecting property on the interface between the clad and core. Moreover, it is easily scratched. A cladding having a thickness of more than 100 microns is disadvantageous in that when twisting, bending, or impacting stress is applied to the resultant optical fiber, the cladding is separated from the core surface and/or cracks are created in the cladding. In order to prevent the above-mentioned disadvantages, it is preferable to adjust the thickness of the cladding to 50 microns or less, more preferably, 30 microns or less.

Usually, the filamentary core has a diameter of from 10 μm to 5 mm microns.

The plastic optical fiber of the present invention can be produced by means of a melt-extruding method in which a specific core in-sheath type extruding die is used. In plastic optical fiber of the present invention, the cladding copolymer contains a fluorine-containing comonomer (A) which causes the resultant copolymer to exhibit an improved thermal decomposition resistance. Therefore, the melt-extruding operation can be carried out at an extruding temperature in the wide range of from 180° C. to 270° C. without foaming, whitening, or thermal decomposition of the cladding polymer (2). Accordingly, the resultant optical fiber exhibits a real value of numerical aperture very close to the theoretical value calculated from the refractive indices $n_1$ and $n_2$ of the core and cladding polymers (1) and (2).

Also, it is important that in the optical fiber of the present invention the core and cladding are very firmly bonded to each other. This means no irregularity is formed in the interface between the core and cladding. Also, even when the optical fiber is bent, the cladding is highly resistant to separation from the core. Accordingly, the reliability of the optical fiber of the present invention is very high in practical light transmitting operation.

The specific examples presented below will serve to more fully elaborate how the present invention can be practically used however, it should be understood that the examples are only illustrative and in no way limit the scope of the present invention.

In the examples, the thermal resistance and bonding property of a cladding polymer (2) and light transmission loss and numerical aperture of an optical fiber were determined as follows.

EVALUATION OF THERMAL RESISTANCE OF CLADDING POLYMER

A cladding polymer was prepared by means of bulk polymerization and pulverized by means of a crusher.

The pulverized cladding copolymer particles were screened through a 16 mesh sieve and, then, a 32 mesh sieve in accordance with Japanese Industrial Standard (JIS) Z-8801. The portion of the copolymer particles which passed through the 16 mesh sieve and remained on the 32 mesh sieve was pelletized in a vent type extruder having a cylinder diameter of 25 mm. The resultant pellets were heated in a hot air atmosphere at a temperature of 270° C. for a predetermined time by means of a gear oven heating method. The reduction (%) in weight of the pellets due to the heating operation was measured. The thermal decomposition resistance and the thermal resistance of the copolymer were evaluated based on the measured value of reduction in weight of the pellets.

BONDING PROPERTY OF CLADDING POLYMER

The above-mentioned portion of the pulverized cladding copolymer which passed through a 16 mesh sieve and remained on a 32 mesh sieve was converted into a film having a thickness of 150 microns by means of heat-pressing at a temperature of 180° C. under a pressure of 100 kg/cm² for 5 minutes. The film was superimposed on a polymethacrylic resin plate and was laminated thereto by heat-pressing at a temperature of 230° C. under a pressure of 5 kg/cm² for 10 minutes.

On the resultant laminate plate, 11 straight linear cuts having a width of 1 mm and a depth of 1 mm were formed in the cladding polymer (2) layer at intervals of 1 mm in the longitudinal direction of the laminate plate. Another 11 straight linear cuts were formed in the lateral direction of the laminate plate in the same manner as that mentioned above, forming 100 separate cells, having a length and width of 1 mm. An adhesive tape was applied on the cell-formed surface of the laminate plate and rapidly peeled therefrom. The number of the cells moved from the laminate plate onto the adhesive tape was counted. The bonding property of the cladding copolymer was evaluated based on the number of cells found on the adhesive tape as follows:

| Class | Evaluation | Number of cells on adhesive tape |
|---|---|---|
| 1 | Excellent | 0 |
| 2 | Ordinary | 1 to 50 |
| 3 | Poor | ≧51 |

LOSS OF LIGHT TRANSMISSION OF OPTICAL FIBER

Loss of light transmission of a plastic optical fiber was determined by means of an apparatus indicated in FIG. 1 as follows.

Referring to FIG. 1, an apparatus 1 for measuring light transmission loss of an optical fiber comprised a stabilized electric power source 2, a halogen lamp 3, a lens 4, an interference filter 5, a lens 6, a photodiode 7, an amplifier 8, and a voltmeter 9, arranged in the above-mentioned sequence. An optical fiber 10 having a predetermined length was placed between the lens 6 and the photodiode 7.

The halogen lamp 2 was connected to and excited by the electric power source 1. The light irradiated from the halogen lamp 2 was converted to parallel rays of light by the lens 4 and then converted to monochromic light by the interference filter 5. The parallel rays of the monochromic light was focused on an end surface 11 of incidence of the optical fiber 10 by means of the lens 6, which had the same numerical aperture as that of the optical fiber 10, so as to transmit the monochromic light through the optical light 10. The monochromic light was attenuated during transmission through the optical fiber 10, and then transmitted out through an opposite end surface 12 of the optical fiber 10. The transmitted light is converted to electric current by means of the photodiode 7. The electric current is amplified by the amplifier 8. The voltmeter 9 measures the voltage of the amplified electric current. The above-mentioned operations are carried out in the dark.

For measurement of light transmission loss by the above-mentioned apparatus, a 0.015 km length of the optical fiber was prepared. The two ends of the optical fiber were cut at right angles to the longitudinal axis of the fiber and the end surfaces were polished smooth. The optical fiber was fixed immovably between the lens 6 and the photodiode 7. The voltage measuring operation was applied to the optical fiber in the dark in accordance with the above-mentioned method. Next, while the light incident end surface 11 of the optical fiber was fixed at the focus of the monochromic light irradiated through the lens 6, an opposite side portion of the original optical fiber having a length of 0.005 km was cut off from the fiber. The residual optical fiber 0.01 km long had a light transmitting end surface 13 which was at right angles to the longitudinal axis of the optical fiber and was polished smooth.

The same voltage measuring operation as that described above was applied to the residual optical fiber in the dark.

The light transmission loss of the optical fiber was calculated in accordance with equation (II):

$$\alpha = \frac{10}{l} \log\left(\frac{I_2}{I_1}\right) \quad (II)$$

wherein α represents a light transmission loss in dB/km of the optical fiber, l represents the length in km of the cut portion of the optical fiber, $I_1$ represents a voltage measured for the original length l of the optical fiber, and $I_2$ represents a voltage measured for the residual optical fiber. The voltages $I_1$ and $I_2$ correspond to the amounts of light transmitted out through the original optical fiber and the residual optical fiber, respectively.

In the examples, the interference filter exhibited a main wavelength of 646 microns. The optical fiber was wound around a bobbin having a diameter of 190 mm, and the light incident end surface and the light transmitting and surface of the optical fiber were spaced about 1 m from each other.

NUMERICAL APERTURE OF A PLASTIC OPTICAL FIBER

Figure 2:
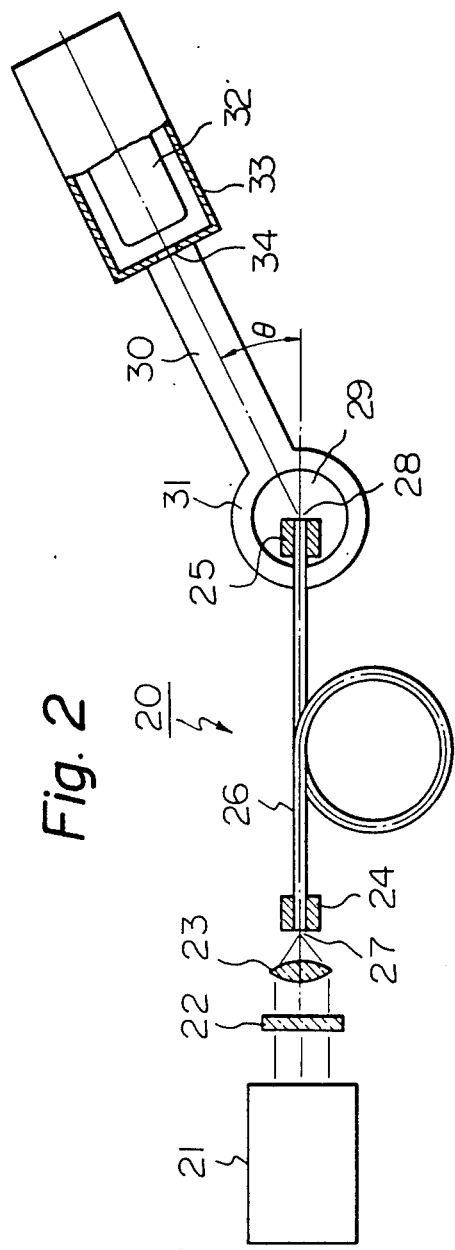
FIG. 2 is an explanatory plane view of an apparatus for measuring a numerical aperture of an optical fiber.

An apparatus indicated in FIG. 2 was used for the measurement of the numerical aperture of an optical fiber.

Referring to FIG. 2, in an apparatus 20, parallel rays of light were irradiated from a light source 21 containing an electric power source (not shown) and a halogen lamp (not shown), to an optical fiber 26 through an interference filter 22 and a lens 23 having a numerical aperture larger than that of the optical fiber 26. The interference filter 22 converted the light irradiated from the light source 21 to monochromic light. The parallel rays of the monochromic light were focused on the light incident end surface 27 of the optical fiber 26 by means of the lens 23. The light end portion and the opposite end portion of the optical incident fiber 26 were supported by supporters 24 and 25. The longitudinal axes of the light incident end portion and the opposite end portion of the optical fiber coincided with the optical axis of the light. Both the end surfaces 27 and 28 of the optical fiber 26 were at right angles to the longitudinal axis of the optical fiber and were polished smooth. The center of optical fiber at the end surface 28, through which surface the light is transmitted out to the outside of the fiber, was positioned at a center of an axis of a fixed shaft 29. The top surface of the fixed shaft is positioned under the supporters 25. The longitudinal axis of the opposite end portion of the optical fiber 26 was at right angles to the axis of the fixed shaft 29. A rotating arm 30 had an annular end poriton 31. The fixed shaft 29 was inserted into the annular portion 31. The rotating arm 30 was rotatable around the fixed shaft 29, and the rotating angle ($\theta$) of the rotating arm 30 was able to be measured. A photomultiplier 32, which was contained in a housing 33 having a hole 34, was connected to the top end of the rotating arm 30.

In the examples, parallel rays of light irradiated from the light source 21 were converted to monochromic light by an interference filter having a main wavelength of 650 microns and a half valve width of 3 mm. The monochromic light was focused on the light incident end surface 27 of an optical fiber 26 having a length of 15 mm and transmitted out through the opposite end surface 28 of the optical fiber. The transmitted light was introduced into the photomultiplier 32 through the horizontally rotatable arm 30 and the hole 34 having a diameter of 1.5 mm and spaced 125 mm from the center of the fixed shaft 29. The photomultiplier 32 converted the transmitted light introduced therein through the hole 34, to electric current and measured the intensity of the current.

The distribution of the transmitted light can be determined from the relationship between the rotating angle ($\theta$) of the rotating arm 30 and the intensity of current measured by the photomultiplier 32. An example of the relationship is indicated in FIG. 3.

Figure 3:
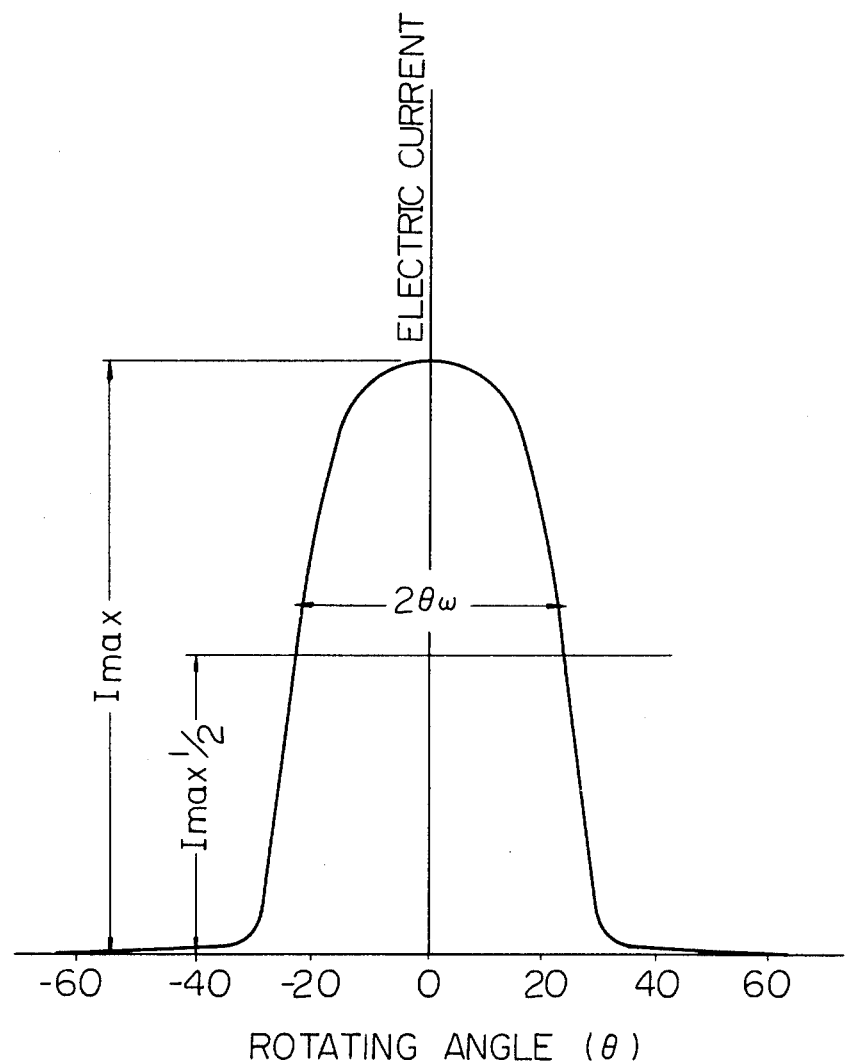
FIG. 3 is a diagram of the distribution of transmitted light from the apparatus indicated in FIG. 2, which transmitted light distribution is determined in relationship with a rotating angle ($\theta$) of a rotating arm and an electric current in a photomultiplier arranged in the apparatus indicated in FIG. 2.

When the maximum value of the measured electric current in represented by $I_{max}$, the value of parameter $2(\theta)w$ corresponding to the electric current value $\frac{1}{2} I_{max}$ is determined from the diagram in FIG. 3.

The numerical aperture (NA) of the optical fiber can be calculated in accordance with equation (III):

$$NA = \sin(\theta)w \quad \text{(III)}$$

EXAMPLES 1 THROUGH 10 AND COMPARATIVE EXAMPLES 1 AND 2

In each of Examples 1 through 10 and Comparative Examples 1 and 2, a core polymer was prepared by charging a polymerization vessel equipped with a spiral ribbon type stirrer with a mixture of 100 parts by weight of methyl methacrylate, 0.04 parts by weight of tert-butylmercaptan, and 0.0017 parts by weight of di-tert-butyl peroxide and by subjecting the mixture to a continuous bulk polymerization at a temperature of 155° C. for 4 hours.

The resultant product was fed into a biaxial screw vent-type extruder and was heated at a temperature of 240° C. at a vent portion under a vacuum pressure of 4 mm Hg to evaporate volatile substances from the product. The resultant dried polymer was supplied into an extruding head at a temperature of 230° C. The core polymer exhibited a refractive index of 1.492.

Separately, a cladding copolymer was prepared by copolymerizing 100 parts by weight of a mixture of the comonomers indicated in Table 1 in the presence of 0.05 parts by weight of azo-bis-isobutyl nitrile and 0.1 parts by weight of n-dodecylmercaptan in an autoclave having a capacity of 2 liters at a temperature of 50° C. for 10 hours and, then, at 70° C. for 5 hours. The resultant copolymer exhibited the properties indicated in Table 2. The cladding copolymer was also fed into the extruding head of the above-mentioned extruder.

The core polymer and the cladding copolymer were extruded from the extruding head through a core-in-sheath type spinneret at a temperature of 230° C. The extruded core-in-sheath type filamentary stream of the polymers was solidified and was taken up at a velocity of 10 mm/min. The core-in-sheath type composite filament was drawn at a temperature of 140° C. at a draw ratio of 1.8 and the resultant optical fiber was wound up on a bobbin.

The resultant optical fiber was composed of a core polymer having a diameter of 480 microns and a cladding polymer having a thickness indicated in Table 2. The resistance of the cladding of the optical fiber to cracking was tested by winding it 20 turns around a rod having a diameter of 5 mm and by detecting the crack-formation in the cladding. The result was as indicated in Table 2.

The interface condition between the core constituent and the cladding was observed by means of a microscope. The result was as indicated in Table 2.

TABLE 1

| | | Comonomeric ingredients used for cladding copolymer | | | | | |
|---|---|---|---|---|---|---|---|
| | | Monomer (A) | | Monomer (B) | | Additional monomer (C) | |
| Example No. | Monomer used for core polymer | Type | Amount (% wt) | Type | Amount (% wt) | Type | Amount (% wt) |
| Example | | | | | | | |
| 1 | Methyl methacrylate | 2,2,2-trifluoroethyl methacrylate | 90 | Methacrylic acid | 2 | Methyl methacrylate | 8 |
| 2 | " | 2,2,2-trifluoroethyl methacrylate | " | Acrylic acid | 2 | " | " |
| 3 | " | 2,2,2-trifluoroethyl methacrylate | " | Glycidyl methacrylate | 2 | " | " |
| 4 | " | 2,2,2-trifluoroethyl methacrylate | " | N—octylacrylamide | 2 | " | " |
| 5 | " | 2,2,2-trifluoroethyl methacrylate | " | N—butoxymethyl-acrylamide | 2 | " | " |
| 6 | " | 2,2,2-trifluoroethyl methacrylate | " | (*)₁ | 2 | " | " |
| 7 | " | 2,2,2-trifluoroethyl | 70 | Methacrylic acid | 2 | " | 28 |

TABLE 1-continued

| Example No. | Monomer used for core polymer | Comonomeric ingredients used for cladding copolymer ||||||
|---|---|---|---|---|---|---|---|
| | | Monomer (A) || Monomer (B) || Additional monomer (C) ||
| | | Type | Amount (% wt) | Type | Amount (% wt) | Type | Amount (% wt) |
| 8 | " | methacrylate 2,2,2-trifluoroethyl methacrylate | 99.5 | " | 0.5 | — | — |
| 9 | " | 2,2,2-trifluoroethyl methacrylate | 90 | " | 2 | Lauryl methacrylate | 8 |
| 10 | " | 2,2,2-trifluoroethyl methacrylate | 95 | " | 5 | — | — |
| Comparative Example | | | | | | | |
| 1 | " | 2,2,2-trifluoroethyl methacrylate | 90 | — | — | Methyl methacrylate | 10 |
| 2 | " | 2,2,2-trifluoroethyl methacrylate | 99.5 | — | — | " | 0.5 |

Note:
(*)₁ - A condensation product of hydroxyethyl acrylate with phthalic anhydride

TABLE 2

| Example No. | Cladding |||||||| Optical fiber |||||||
|---|---|---|---|---|---|---|---|---|---|---|---|---|---|---|
| | Thickness (micron) | Properties of copolymer ||||||| Light transmission loss (dB/km) Wave length ||| Numerical aperture || Interface condition between core and clad | Resistance of cladding to cracking |
| | | Polymerization conversion (%) | Refractive index $n_D^{25}$ | Bonding property (class) | Reduction in weight at 270° C. ||| 520 nm | 570 nm | 650 nm | Measured | Theoretical | | |
| | | | | | 20 min | 60 min | 120 min | | | | | | | |
| Example | | | | | | | | | | | | | | |
| 1 | 8 | 99 | 1.425 | 1 | 8 | 10 | 15.5 | 80 | 73 | 126 | 0.410 | 0.440 | True circle No foreign matter | No cracking |
| 2 | 10 | 98 | 1.423 | 1 | 15 | 85 | 95 | 88 | 83 | 131 | 0.351 | 0.448 | True circle No foreign matter | " |
| 3 | 10 | 99 | 1.425 | 1 | 18 | 83 | 94 | 95 | 86 | 137 | 0.328 | 0.440 | True circle No foreign matter | " |
| 4 | 8 | 99 | 1.425 | 1 | 18 | 80 | 92 | 94 | 85 | 139 | 0.335 | 0.440 | True circle No foreign matter | " |
| 5 | 10 | 99 | 1.425 | 1 | 13 | 78 | 90 | 98 | 89 | 148 | 0.350 | 0.440 | True circle No foreign matter | " |
| 6 | 10 | 98 | 1.425 | 1 | 8 | 75 | 90 | 95 | 85 | 137 | 0.372 | 0.440 | True circle No foreign matter | " |
| 7 | 10 | 99 | 1.432 | 1 | 8 | 13 | 17.0 | 84 | 73 | 130 | 0.382 | 0.419 | True circle No foreign matter | " |
| 8 | 15 | 99 | 1.417 | 1 | 8 | 15 | 18 | 85 | 74 | 132 | 0.435 | 0.467 | True circle No foreign matter | " |
| 9 | 10 | 99 | 1.426 | 1 | 10 | 19 | 25 | 110 | 100 | 155 | 0.415 | 0.439 | True circle No foreign matter | " |
| 10 | 10 | 99 | 1.429 | 1 | 5 | 13 | 15 | 107 | 95 | 151 | 0.380 | 0.430 | True circle No foreign matter | " |
| Comparative Example | | | | | | | | | | | | | | |
| 1 | 10 | 99 | 1.425 | 3 | 35 | 89 | 96 | 183 | 160 | 205 | 0.28 | 0.440 | True circle No foreign matter | Many cracks |
| 2 | 10 | 99 | 1.417 | 3 | 38 | 90 | 96 | 187 | 165 | 207 | 0.27 | 0.467 | True circle No foreign matter | " |

EXAMPLES 11 THROUGH 20 AND COMPARATIVE EXAMPLES 3 AND 4

In each of Examples 11 through 20 and Comparative Examples 3 and 4, the same procedures as those described in Example 1 were carried out except that the cladding copolymer was obtained from the comonomers indicated in Table 3.

The properties of the cladding composition, the cladding copolymer, and the resultant optical fiber were as indicated in Table 4.

TABLE 3

| Example No. | Monomer used for core polymer | Monomers used for cladding copolymer | | | | | |
|---|---|---|---|---|---|---|---|
| | | Monomer (A) | | Monomer (B) | | Additional monomer (C) | |
| | | Type | Amount (% wt) | Type | Amount (% wt) | Type | Amount (% wt) |
| Example | | | | | | | |
| 11 | Methyl methacrylate | 2,2,3,3-tetrafluoro-propyl methacrylate | 90 | Methacrylic acid | 2 | Methyl methacrylate | 8 |
| 12 | " | 2,2,3,3-tetrafluoro-propyl methacrylate | " | Acrylic acid | 2 | " | " |
| 13 | " | 2,2,3,3-tetrafluoro-propyl methacrylate | " | Glycidyl methacrylate | 2 | " | " |
| 14 | " | 2,2,3,3-tetrafluoro-propyl methacrylate | " | N—octylacrylamide | 2 | " | " |
| 15 | " | 2,2,3,3-tetrafluoro-propyl methacrylate | " | N—butoxymethyl-acrylamide | 2 | " | " |
| 16 | " | 2,2,3,3-tetrafluoro-propyl methacrylate | " | (*)1 | 2 | " | " |
| 17 | " | 2,2,3,3-tetrafluoro-propyl methacrylate | 70 | Methacrylic acid | 2 | " | 28 |
| 18 | " | 2,2,3,3-tetrafluoro-propyl methacrylate | 99.5 | " | 0.5 | — | — |
| 19 | " | 2,2,3,3-tetrafluoro-propyl methacrylate | 90 | " | 2 | Lauryl methacrylate | 8 |
| 20 | " | 2,2,3,3-tetrafluoro-propyl methacrylate | 90 | " | 10 | — | — |
| Comparative Example | | | | | | | |
| 3 | " | 2,2,3,3-tetrafluoro-propyl methacrylate | 90 | — | — | Methyl methacrylate | 10 |
| 4 | " | 2,2,3,3-tetrafluoro-propyl methacrylate | 99.5 | — | — | " | 0.5 |

TABLE 4

| Example No. | Cladding Properties of copolymer | | | | Reduction in weight at 270° C. | | | Optical fiber | | | | | |
|---|---|---|---|---|---|---|---|---|---|---|---|---|---|
| | Thickness (micron) | Polymerization conversion (%) | Refractive index $n_D^{25}$ | Bonding property (class) | 20 min | 60 min | 120 min | Light transmission loss (dB/km) Wave length | | | Numerical aperture | | Interface condition between core and cladding | Resistance of cladding to cracking |
| | | | | | | | | 520 nm | 570 nm | 650 nm | Measured | Theoretical | | |
| Example | | | | | | | | | | | | | | |
| 11 | 8 | 99 | 1.427 | 1 | 9 | 13 | 16 | 82 | 75 | 125 | 0.408 | 0.436 | True circle No foreign matter | No cracking |
| 12 | 8 | 98 | 1.425 | 1 | 15 | 83 | 95 | 87 | 85 | 133 | 0.350 | 0.442 | True circle No foreign matter | " |
| 13 | 10 | 98 | 1.426 | 1 | 20 | 82 | 94 | 95 | 88 | 139 | 0.328 | 0.439 | True circle No foreign matter | " |
| 14 | 10 | 99 | 1.427 | 1 | 18 | 77 | 93 | 94 | 87 | 139 | 0.322 | 0.436 | True circle No foreign matter | " |
| 15 | 10 | 97 | 1.427 | 1 | 13 | 80 | 95 | 98 | 91 | 150 | 0.329 | 0.436 | True circle No foreign matter | " |
| 16 | 10 | 98 | 1.428 | 1 | 7 | 79 | 96 | 93 | 87 | 139 | 0.372 | 0.436 | True circle No foreign matter | " |
| 17 | 15 | 98 | 1.433 | 1 | 8 | 15 | 18 | 87 | 78 | 138 | 0.383 | 0.432 | True circle No foreign matter | " |
| 18 | 8 | 99 | 1.417 | 1 | 8 | 13 | 18 | 89 | 79 | 138 | 0.435 | 0.467 | True circle No foreign matter | " |
| 19 | 10 | 97 | 1.428 | 1 | 9 | 17 | 27 | 115 | 99 | 156 | 0.415 | 0.436 | True circle No foreign matter | " |
| 20 | 10 | 99 | 1.430 | 1 | 5 | 12 | 15 | 109 | 98 | 154 | 0.370 | 0.426 | True circle No foreign matter | " |
| Comparative Example | | | | | | | | | | | | | | |
| 3 | 10 | 99 | 1.428 | 3 | 35 | 89 | 96 | 201 | 195 | 218 | 0.27 | 0.436 | True circle No foreign | Many cracks |

TABLE 4-continued

| Example No. | Cladding Properties of copolymer | | | | | | | Optical fiber | | | | | | |
|---|---|---|---|---|---|---|---|---|---|---|---|---|---|---|
| | Thickness (micron) | Polymerization conversion (%) | Refractive index $n_D^{25}$ | Bonding property (class) | Reduction in weight at 270° C. | | | Light transmission loss (dB/km) Wave length | | | Numerical aperture | | Interface condition between core and cladding | Resistance of cladding to cracking |
| | | | | | 20 min | 60 min | 120 min | 520 nm | 570 nm | 650 nm | Measured | Theoretical | | |
| 4 | 10 | 99 | 1.417 | 3 | 39 | 90 | 96 | 192 | 205 | 209 | 0.28 | 0.467 | matter True circle No foreign matter | " |

EXAMPLES 21 THROUGH 30 AND COMPARATIVE EXAMPLES 5 AND 6

In each of Examples 21 through 30 and Comparative Examples 5 and 6, the same procedures as those described in Example 1 were carried out except that the cladding copolymer was prepared from the comonomers indicated in Table 5.

The properties of the resultant optical fibers were as indicated in Table 6.

TABLE 5

| Example No. | Monomer used for core polymer | Monomers used for cladding copolymer | | | | | |
|---|---|---|---|---|---|---|---|
| | | Monomer (A) | | Monomer (B) | | Additional monomer (C) | |
| | | Type | Amount (% wt) | Type | Amount (% wt) | Type | Amount (% wt) |
| Example | | | | | | | |
| 21 | Methyl methacrylate | 2,2,3,3,3-pentafluoropropyl methacrylate | 90 | Methacrylic acid | 2 | Methyl methacrylate | 8 |
| 22 | " | 2,2,3,3,3-pentafluoropropyl methacrylate | " | Acrylic acid | 2 | " | " |
| 23 | " | 2,2,3,3,3-pentafluoropropyl methacrylate | " | Glycidyl methacrylate | 2 | " | " |
| 24 | " | 2,2,3,3,3-pentafluoropropyl methacrylate | " | N—octylacrylamide | 2 | " | " |
| 25 | " | 2,2,3,3,3-pentafluoropropyl methacrylate | " | N—butoxymethylacrylamide | 2 | " | " |
| 26 | " | 2,2,3,3,3-pentafluoropropyl methacrylate | " | (*)₁ | 2 | " | " |
| 27 | " | 2,2,3,3,3-pentafluoropropyl methacrylate | 60 | Methacrylic acid | 2 | " | 38 |
| 28 | " | 2,2,3,3,3-pentafluoropropyl methacrylate | 99.5 | " | 0.5 | — | — |
| 29 | " | 2,2,3,3,3-pentafluoropropyl methacrylate | 70 | " | 2 | Lauryl methacrylate | 28 |
| 30 | " | 2,2,3,3,3-pentafluoropropyl methacrylate | 70 | " | 5 | Methyl methacrylate | 25 |
| Comparative Example | | | | | | | |
| 5 | " | 2,2,3,3,3-pentafluoropropyl methacrylate | 70 | — | — | Methyl methacrylate | 30 |
| 6 | " | 2,2,3,3,3-pentafluoropropyl methacrylate | 99.5 | — | — | " | 0.5 |

Note:
(*)₁ - A condensation product of hydroxyethyl acrylate with phthalic anhydride

TABLE 6

| Example No. | Cladding Properties of copolymer | | | | | | | Optical fiber | | | | | | |
|---|---|---|---|---|---|---|---|---|---|---|---|---|---|---|
| | Thickness (micron) | Polymerization conversion (%) | Refractive index $n_D^{25}$ | Bonding property (class) | Reduction in weight at 270° C. | | | Light transmission loss (dB/km) Wave length | | | Numerical aperture | | Interface condition between core and cladding | Resistance of cladding to cracking |
| | | | | | 20 min | 60 min | 120 min | 520 nm | 570 nm | 650 nm | Measured | Theoretical | | |
| Example | | | | | | | | | | | | | | |
| 21 | 8 | 99 | 1.422 | 1 | 8 | 12 | 15 | 82 | 75 | 126 | 0.415 | 0.452 | True circle No foreign matter | No cracking |
| 22 | 8 | 98 | 1.423 | 1 | 17 | 79 | 93 | 85 | 82 | 131 | 0.390 | 0.448 | True circle No foreign matter | " |
| 23 | 8 | 99 | 1.425 | 1 | 18 | 83 | 94 | 93 | 85 | 139 | 0.322 | 0.442 | True circle No foreign matter | " |
| 24 | 10 | 99 | 1.425 | 1 | 18 | 80 | 95 | 92 | 85 | 140 | 0.330 | 0.442 | True circle No foreign | " |

TABLE 6-continued

| | | Cladding | | | | | | | | | | | |
|---|---|---|---|---|---|---|---|---|---|---|---|---|---|
| | | Properties of copolymer | | | | | | Optical fiber | | | | | |
| | | | | | Reduction in weight at 270° C. | | | Light transmission loss (dB/km) Wave length | | | Numerical aperture | | Interface condition | |
| Example No. | Thickness (micron) | Polymerization conversion (%) | Refractive index $n_D^{25}$ | Bonding property (class) | 20 min | 60 min | 120 min | 520 nm | 570 nm | 650 nm | Measured | Theoretical | between core and cladding | Resistance of cladding to cracking |
| 25 | 10 | 98 | 1.425 | 1 | 13 | 78 | 90 | 100 | 89 | 155 | 0.350 | 0.442 | True circle No foreign matter | " |
| 26 | 10 | 99 | 1.426 | 1 | 8 | 75 | 90 | 95 | 85 | 151 | 0.377 | 0.439 | True circle No foreign matter | " |
| 27 | 10 | 99 | 1.423 | 1 | 8 | 13 | 17 | 83 | 73 | 130 | 0.380 | 0.448 | True circle No foreign matter | " |
| 28 | 10 | 99 | 1.409 | 2 | 8 | 15 | 18 | 83 | 73 | 132 | 0.440 | 0.491 | True circle No foreign matter | " |
| 29 | 10 | 98 | 1.425 | 1 | 10 | 19 | 25 | 110 | 100 | 155 | 0.415 | 0.442 | True circle No foreign matter | " |
| 30 | 8 | 99 | 1.427 | 1 | 5 | 13 | 14 | 109 | 93 | 155 | 0.382 | 0.436 | True circle No foreign matter | " |
| Comparative Example | | | | | | | | | | | | | | |
| 5 | 10 | 99 | 1.423 | 3 | 39 | 90 | 96 | 177 | 160 | 210 | 0.27 | 0.448 | True circle No foreign matter | Many cracks |
| 6 | 10 | 99 | 1.410 | 3 | 41 | 91 | 96 | 187 | 171 | 210 | 0.27 | 0.488 | True circle No foreign matter | " |

EXAMPLES 31 THROUGH 35

In each of Examples 31 through 35, the same procedures as those described in Example 1 were carried out except that the cladding copolymer was prepared from the comonomers indicated in Table 7.

The results of measurements are indicated in Table 8.

TABLE 7

| | | Monomers used for cladding copolymer | | | | | |
|---|---|---|---|---|---|---|---|
| | | Monomer (A) | | Monomer (B) | | Additional monomer (C) | |
| Example No. | Monomer used for core polymer | Type | Amount (% wt) | Type | Amount (% wt) | Type | Amount (% wt) |
| 31 | Methyl methacrylate | 3FA(*)$_2$ | 49 | Methacrylic acid | 2 | Methyl methacrylate | 49 |
| 32 | " | 3FA(*)$_2$ | 49 | " | 2 | 3FM(*)$_5$ | 49 |
| 33 | " | 4FA(*)$_3$ | 49 | " | 2 | 5FM(*)$_6$ | 49 |
| 34 | " | 5FA(*)$_4$ | 49 | " | 2 | Methyl methacrylate | 49 |
| 35 | " | 5FA(*)$_4$ | 70 | " | 1 | " | 29 |

Note:
(*)$_2$ - 2,2,2-Trifluoroethyl acrylate
(*)$_3$ - 2,2,3,3-Tetrafluoropropyl acrylate
(*)$_4$ - 2,2,3,3,3-Pentafluoropropyl acrylate
(*)$_5$ - 2,2,2-Trifluoroethyl methacrylate
(*)$_6$ - 2,2,3,3,3-Pentafluoropropyl methacrylate

TABLE 8

| | | Cladding Properties of copolymer | | | | | | Optical fiber | | | | | | |
|---|---|---|---|---|---|---|---|---|---|---|---|---|---|---|
| | | | | | Reduction in weight at 270° C. | | | Light transmission loss (dB/km) Wave length | | | Numerical aperture | | Interface condition | |
| Example No. | | Polymerization conversion (%) | Refractive index $n_D^{25}$ | Bonding property (class) | 20 min | 60 min | 120 min | 520 nm | 570 nm | 650 nm | Measured | Theoretical | between core and cladding | Resistance of cladding to cracking |
| Example | 31 | 99 | 1.445 | 1 | 25 | 88 | 94 | 98 | 88 | 146 | 0.339 | 0.372 | True circle No foreign matter | No cracking |
| | 32 | 99 | 1.410 | 1 | 29 | 89 | 94 | 94 | 85 | 139 | 0.444 | 0.488 | True circle No foreign matter | " |
| | 33 | 98 | 1.395 | 1 | 29 | 88 | 96 | 88 | 81 | 130 | 0.476 | 0.529 | True circle No foreign matter | " |

TABLE 8-continued

| | Cladding Properties of copolymer | | | | | | Optical fiber | | | | | | |
|---|---|---|---|---|---|---|---|---|---|---|---|---|---|
| | | | | Reduction in weight at 270° C. | | | Light transmission loss (dB/km) Wave length | | | Numerical aperture | | Interface condition between | |
| Example No. | Poly- merization conversion (%) | Refrac- tive index $n_D^{25}$ | Bonding property (class) | 20 min | 60 min | 120 min | 520 nm | 570 nm | 650 nm | Meas- ured | Theoret- ical | core and cladding | Resistance of cladding to cracking |
| 34 | 99 | 1.440 | 1 | 23 | 83 | 93 | 95 | 85 | 140 | 0.350 | 0.390 | True circle No foreign matter | " |
| 35 | 99 | 1.425 | 1 | 30 | 90 | 96 | 94 | 85 | 138 | 0.400 | 0.440 | True circle No foreign matter | " |

Having now fully described this invention, it will be apparent to one of ordinary skill in the art that many changes and modifications can be made thereto without departing from the spirit or scope of the invention as set forth herein.

What is claimed is:

1. A plastic optical fiber comprising a core and a cladding, wherein said core comprises a transparent polymer material (1); and said cladding comprises a transparent copolymer (2) comprising about 20 to 99.95% by weight of a comonomer (A) selected from the group consisting of fluoroalkylacrylates wherein the alkyl radical has from 1 to 12 carbon atoms, fluoroalkylmethacrylates wherein the alkyl radical has from 1 to 12 carbon atoms, and a mixture of two or more of these compounds; 0.05 to 10% by weight of a comonomer (B) comprising at least one vinyl monomer having at least one hydrophilic radical, wherein said core polymer (1) and said cladding copolymer (2) having refractive indices $n_1$ and $n_2$, respectively, and which satisfy the relationship (I):

$$n_1 - n_2 \geq 0.01 \qquad (I).$$

2. The plastic optical fiber as claimed in claim 1, wherein said cladding (2) further contains 79.95% by weight or less of an additional comonomer (C) consisting of at least one vinyl monomer different from the comonomers (A) and (B).

3. The plastic optical fiber as claimed in claim 1, wherein said cladding copolymer has a thickness of about 1 to 100 microns.

4. The plastic optical fiber as claimed in claim 3, wherein said cladding copolymer has a thickness of about 1 to 30 microns.

5. The plastic optical fiber as claimed in claim 1, wherein said core is a filamentary core having a diameter of about 10 μm to 5 mm.

6. The plastic optical fiber as claimed in claim 1, wherein said comonomer (A) consists of at least one member selected from the group consisting of 2,2,2-trifluoroethyl acrylate and methacrylate; 2,2,3,3-tetrafluoropropyl acrylate and methacrylate; and 2,2,3,3,3-pentafluoropropyl acrylate and methacrylate.

7. The plastic optical fiber as claimed in claim 1, wherein said hydrophilic vinyl monomer (B) is selected from the group consisting of ethylenically unsaturated mono-, di- and poly-carboxylic acids.

8. The plastic optical fiber as claimed in claim 7, wherein said ethylenically unsaturated monocarboxylic acid is methacrylic acid.

9. The plastic optical fiber as claimed in claim 1, wherein said hydrophilic vinyl monomer (B) is selected from ethylenically unsaturated epoxy monomers.

10. The plastic optical fiber as claimed in claim 1, wherein said hydrophilic vinyl monomer (B) is selected from the group consisting of ethylenically unsaturated carboxylic amides, N-alkyl-carboxylic amides, N-methylolcarboxylic amides and alkylethers of the above-mentioned amides.

11. The plastic optical fiber as claimed in claim 1, wherein said hydrophilic vinyl monomer is selected from the group consisting of acrylic amide, methacrylic amide, N-methylacrylic amide, N,N'-diethylacrylic amide, and methylethers and ethylethers of the above-mentioned amides.

12. The plastic optical fiber as claimed in claim 1, wherein the refractive index, $n_1$, of said core polymer (1) is 1.44 or greater.

13. The plastic optical fiber as claimed in claim 1, wherein the refractive index, $n_2$, of said cladding copolymer (2) is about 1.38 to 1.45.

14. The plastic optical fiber as claimed in claim 1, wherein the difference $(n_1 - n_2)$ of said refractive indices $n_1$ and $n_2$ is in the range of about 0.01 to 0.20.

15. The plastic optical fiber as claimed in claim 1, wherein said core polymer (1) comprises at least one polystyrene, polymethylmethacrylate, or methylmethacrylate copolymer containing at least 70% by weight of methylmethacrylate, polycarbonates, deuterated styrene copolymers containing at least 70% by weight of deuterated styrene having a degree of deuteration of at least 50%, and deuterated methylmethacrylate copolymers having a degree of deuteration of at least 50%.

16. The plastic optical fiber as claimed in claim 1, wherein said cladding copolymer (2) is a copolymer comprising 20% to 99.95% by weight of at least one fluoroalkyl methacrylate (A), 0.05% to 10% by weight of at least one vinyl monomer (B) having at least one hydrophilic radical, and 0% to 79.95% by weight of at least one vinyl monomer (C) which is different from the above-mentioned monomers (A) and (B), thereby attenuating the refractive index of said cladding copolymer.

17. A method for opreparing the plastic optical fiber as claimed in claim 1, which comprises forming said plastic optical fiber by melg-extrusion at an extrusion temperature in the range of 180° to 270° without foaming, whitening or thermal decomposition.

* * * * *